May 5, 1942.　　　　　　J. MIHALYI　　　　　　2,282,075
MOTOR DRIVE OPERATING MECHANISM FOR ROLL FILM CAMERAS
Filed May 3, 1940　　　　　4 Sheets-Sheet 1
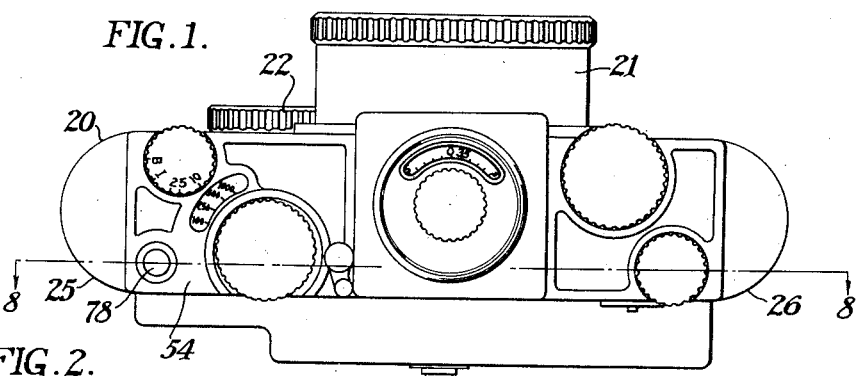
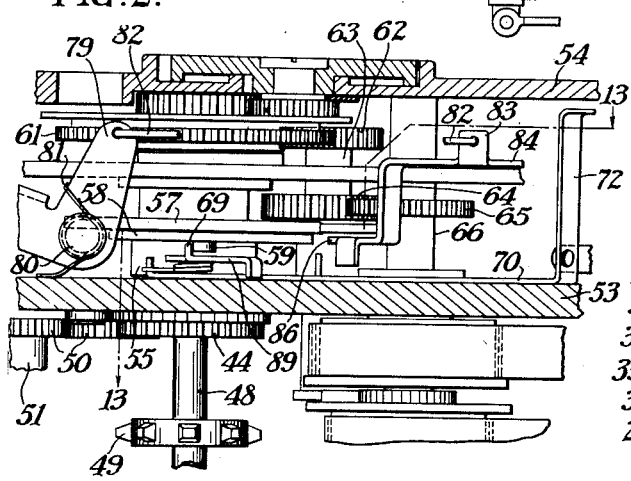
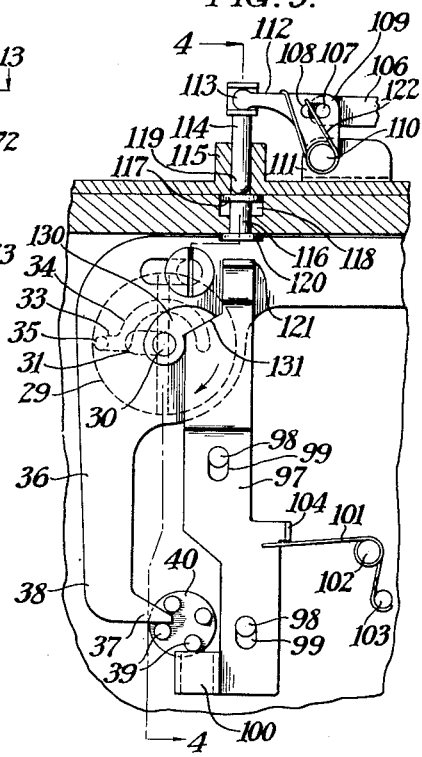
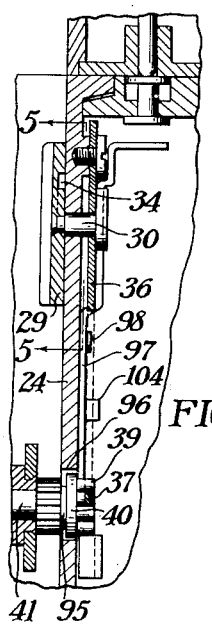
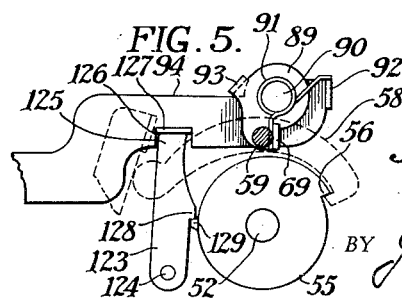
JOSEPH MIHALYI
INVENTOR
BY
ATTORNEYS

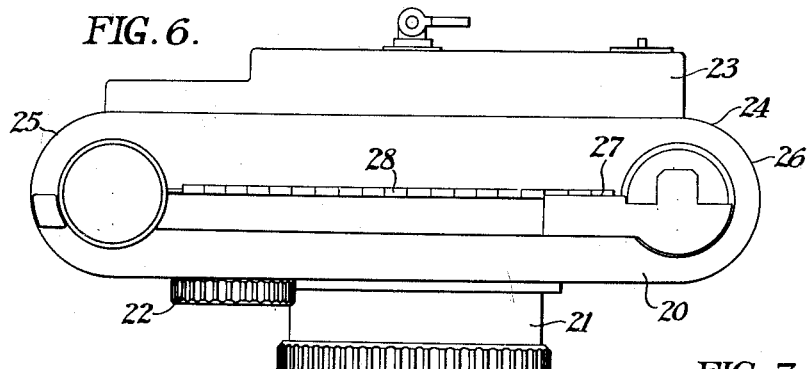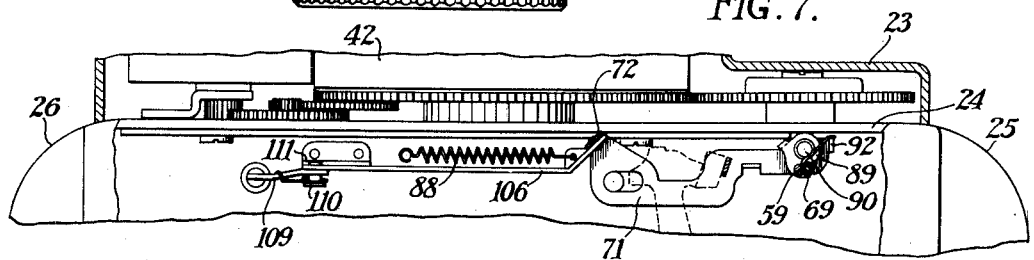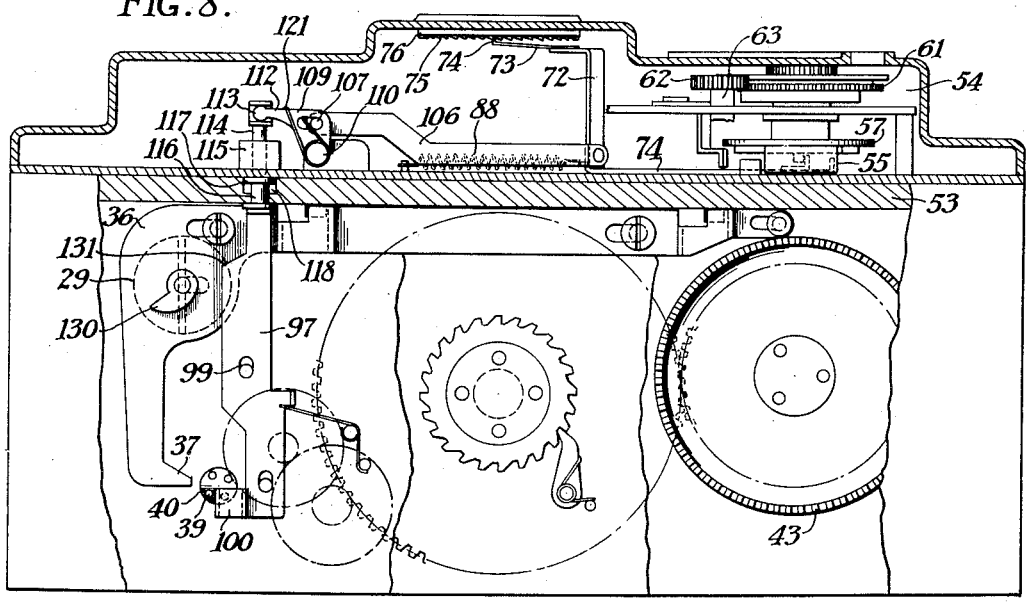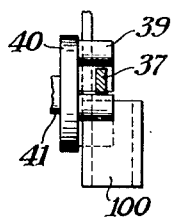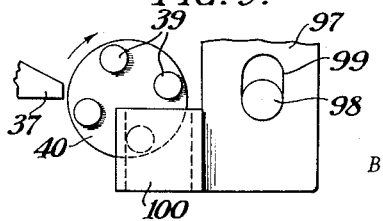

JOSEPH MIHALYI
INVENTOR

May 5, 1942.   J. MIHALYI   2,282,075
MOTOR DRIVE OPERATING MECHANISM FOR ROLL FILM CAMERAS
Filed May 3, 1940   4 Sheets-Sheet 4

JOSEPH MIHALYI
INVENTOR

BY *Newton M. Perrins*
*J. Griffin Little*
ATTORNEYS

Patented May 5, 1942

2,282,075

UNITED STATES PATENT OFFICE 2,282,075

MOTOR DRIVE OPERATING MECHANISM FOR ROLL FILM CAMERAS

Joseph Mihalyi, Rochester, N. Y., assignor to Eastman Kodak Company, Rochester, N. Y., a corporation of New Jersey Application May 3, 1940, Serial No. 333,177

14 Claims. (Cl. 242—71)

The present invention relates to roll film cameras of the type having a spring motor for automatically moving or shifting the film strip after each exposure, and more particularly to a novel locking means for the motor drive unit.

One object of the inventon is the provision of an arrangement for automatically locking the film winding mechanism at the completion of each winding operation.

Another object of the invention is the provision of a locking device of the class described which is controlled from and in timed relation with the film winding mechanism.

A further object of the invention is the provision of a locking device which is applied to the governor shaft of the spring motor unit, the governor shaft being the part carrying the least load.

A still further object of the invention is the provision of such a locking device which cooperates with an independent locking latch to insure the locking of the motor drive unit and the film winding mechanism at the completion of each film winding operation.

Yet another object of the invention is the provision of a locking device which is released upon actuation of the shutter so as to free the motor power unit so the latter may be rendered effective to wind up the exposed film area and to simultaneously move an unexposed area into exposing position, yet which is automatically moved into locking engagement with the governor shaft of the power unit to arrest further rotation of the winding means when the new film area is in position.

Still another object of the invention is the provision of a locking mechanism which is simple in construction, relatively inexpensive to manufacture, automatic and positive in its action, and requires no attention on the part of the camera user.

To these and other ends, the invention resides in certain improvements and combinations of parts, all as will be hereinafter more fully described, the novel features being pointed out in the claims at the end of the specification.

In the drawings:

Fig. 1 is a top plan view of a camera provided with a spring motor drive which is locked by a locking device constructed in accordance with the present invention;

Fig. 2 is a fragmentary sectional view of a portion of the camera illustrated in Fig. 1, but on a larger scale than the latter, with parts in section and parts in elevation, showing the relation of the film measuring shaft and the control mechanism for the locking device for the film winding mechanism;

Fig. 3 is a fragmentary view through another portion of the camera and on a larger scale than Fig. 1, showing the dual locking arrangement for the spring motor drive;

Fig. 4 is a vertical sectional view taken substantially on line 4—4 of Fig. 3 showing the relation of the two locking mechanisms for the governor shaft and the spring motor drive;

Fig. 5 is a fragmentary top plan view of a portion of the locking device control mechanism illustrated in Fig. 7, but on a larger scale than the latter, showing the arrangement of the pivotal lugs mounted on the ends of a slidable bar, and a cooperating lug for preventing the locking of the spring motor unit until exposure has been completed;

Fig. 6 is a bottom plan view of the camera illustrated in Fig. 1, showing the arrangement for detachably securing the motor drive-unit back to the camera body;

Fig. 7 is a fragmentary view through a portion of the camera, on a somewhat larger scale than Figs. 1 and 6, with parts in section and parts in elevation, showing the relation of the spring motor drive and the slidable control bar for the motor locking mechanism;

Fig. 8 is a vertical sectional view taken substantially on line 8—8 of Fig. 1, showing the spring motor drive with its locking device and the control mechanism for the device, the rear camera wall being partly broken away to show the locking ratchet for the spring motor;

Fig. 9 is a fragmentary view of a portion of the mechanism illustrated in Fig. 8 but on a larger scale than the latter, showing the end of the governor shaft for the spring motor drive, and the relation thereto of the two locking members therefor;

Fig. 10 is a side view of the mechanism illustrated in Fig. 9;

Similar reference numerals throughout the various views indicate the same parts.

Figure 11:
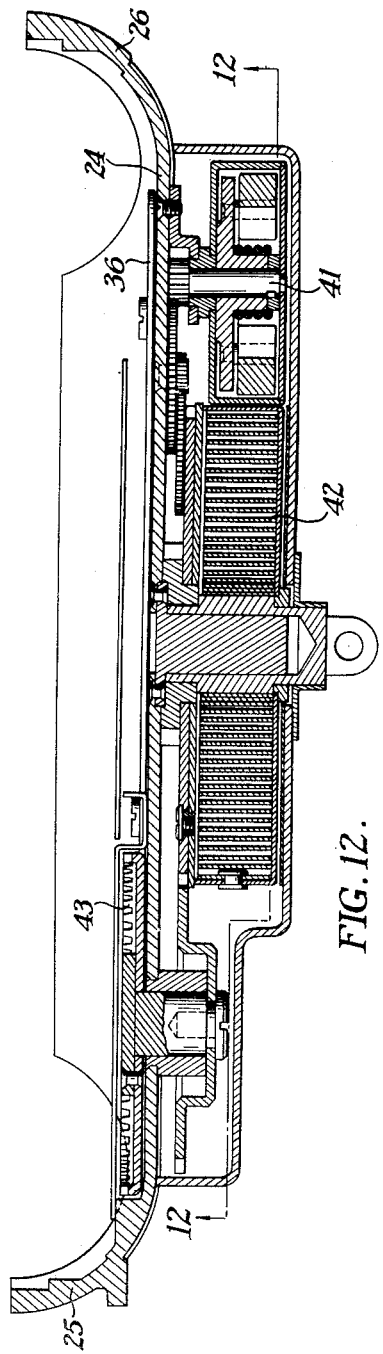
Fig. 11 is a longitudinal sectional view through the motor drive unit and camera back when removed from the camera, and taken substantially on line 11—11 of Fig. 12.
Figure 12:
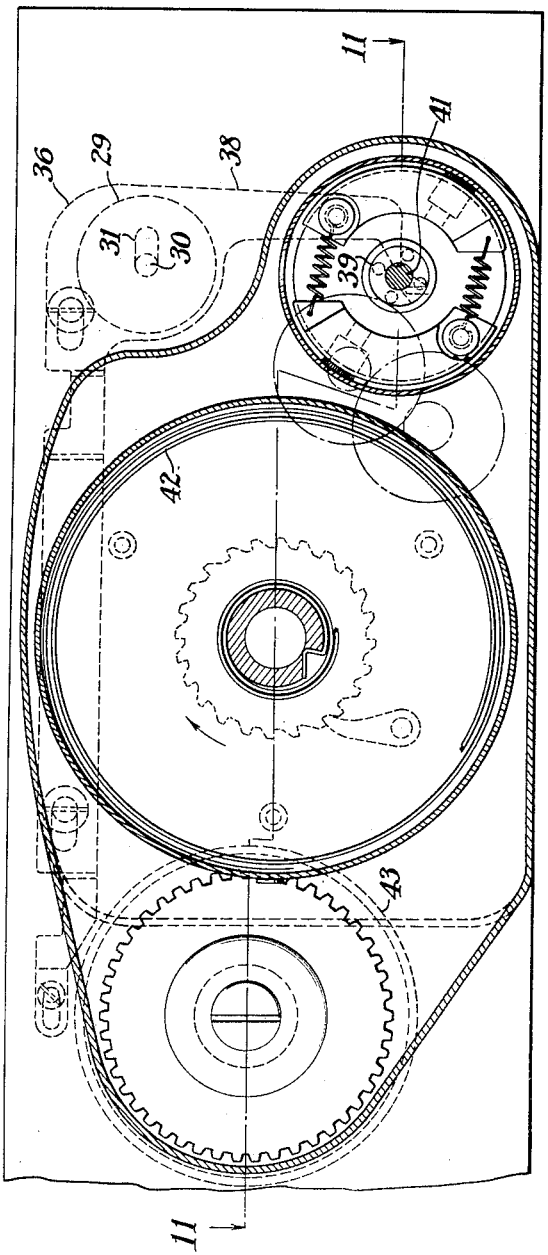
Fig. 12 is a plan view of the motor drive unit removed from the camera as it would appear if viewed on line 12—12 of Fig. 11.

The present invention is embodied in the present instance, by way of illustration, in a small size camera adapted for taking a large number of exposures on miniature marginal perforated film, such as motion picture film. The camera comprises a body portion 20 the front of which carries a sleeve 21 which houses the objective lenses, not shown. Focusing is secured by turning the knurled ring 22. The present invention relates particularly to a locking mechanism for a spring motor drive or power unit which is connected to the film winding mechanism to automatically rotate the latter to wind the film at the completion of each exposure.

This motor drive unit is of the general construction as shown in the applicant's active Patent No. 2,135,984, issued November 8, 1938, and is detachably secured to the camera body in the manner clearly shown and described in this patent to which reference may be had for a detailed description. This motor device may be briefly described as being mounted in a housing 23 carried by a plate 24, the ends of which are curved at 25 and 26 to form walls of a spool chamber, not shown. One edge 27 of the plate 24 carries hinge members which cooperate with complementary hinge members on the body 20 to provide a hinged connection 28 between the plate 24 and the camera body 20, as shown in Fig. 6. These hinged members are detachably connected in a manner set forth in the above-mentioned patent so that the motor drive unit may be detachably secured to the camera body.

In order to detach the motor drive unit and its supporting plate 24, a latch on the plate 24 must first be released. This latch comprises a slidable button 29 movable in a recess, not shown, in the plate 24, and carrying a stud 30 which is adapted to slide in a slot 31 in the plate 24, see Fig. 3. The under side of the button 29 is formed with a slot 32 having a radial portion 33 and a curved portion 34 connected to the portion 33 and concentric with the stud 30. This slot is adapted to receive a pin 35 on the plate 24. To release the plate 24 from the body 20, the button 29 is first rotated in a clockwise direction, as viewed in Fig. 3, to cause the curved portion 34 of the button to move over the pin 35 until the latter registers with the radial portion 33. The button is then slid to the right, as shown in Fig. 3. An L-shaped latch bar 36 is connected to button 29 by means of the stud 30 so that the rightward movement of the button also similarly moves the bar 36 to the position shown in Fig. 3 to release the bar 36 from cooperating lugs, not shown, on the camera body. In this released position, a hook 37 on the arm 38 of the bar 36 is positioned to engage lugs 39 formed on a disk 40 carried on the end of the governor shaft 41 of the motor mechanism, to be later described. By means of this arrangement, the motor drive unit is locked so that it will not run down or unwind when removed from the camera body. This governor shaft 41 is connected through a suitable gear train to the spring motor 42 which, in turn, is geared to a disk-shaped or crown gear 43 which meshes with and drives a gear 44 operatively connected to the film winding mechanism to rotate the latter to move the film strip across the camera.

The above-described mechanism is substantially that shown and described in the applicant's Patent No. 2,135,984, issued November 8, 1938. As such mechanism does not per se constitute a part of the present invention, it is believed that a further detailed discussion is not necessary to a complete understanding of the present invention.

The gear 44 is secured to one end of a measuring roll shaft 48 on which are mounted a pair of sprockets 49, only one of which is shown, adapted to engage the marginal perforations of a film strip to move or feed the latter across the camera. The gear 44 is, in turn, connected through a suitable gear train, designated broadly at 50, to the take-up spool 51 to positively drive the latter to wind the film strip thereon. In order to compensate for increasing diameter of the film on a spool 51, the latter is provided with a suitable slip clutch, not shown. As such a clutch does not constitute a part of, and is not necessary to a complete understanding of, the present invention a showing thereof is not deemed necessary.

Figure 13:
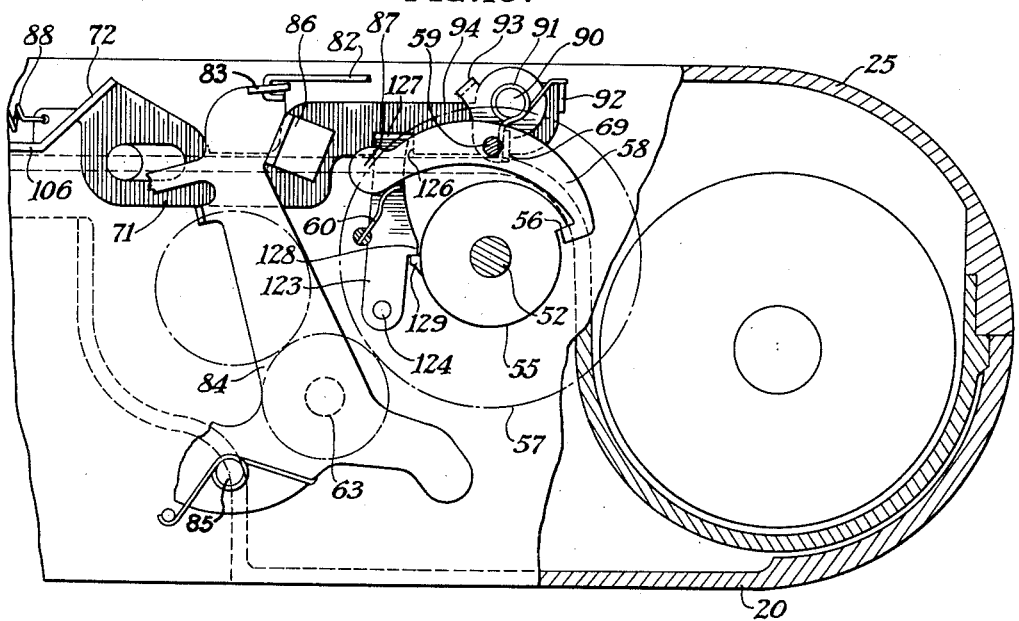
Fig. 13 is a fragmentary plan view of a portion of the mechanism illustrated in Fig. 2, but on a larger scale than the latter, showing the arrangement of the various locking members at the completion of the film winding operation.
Figure 14:
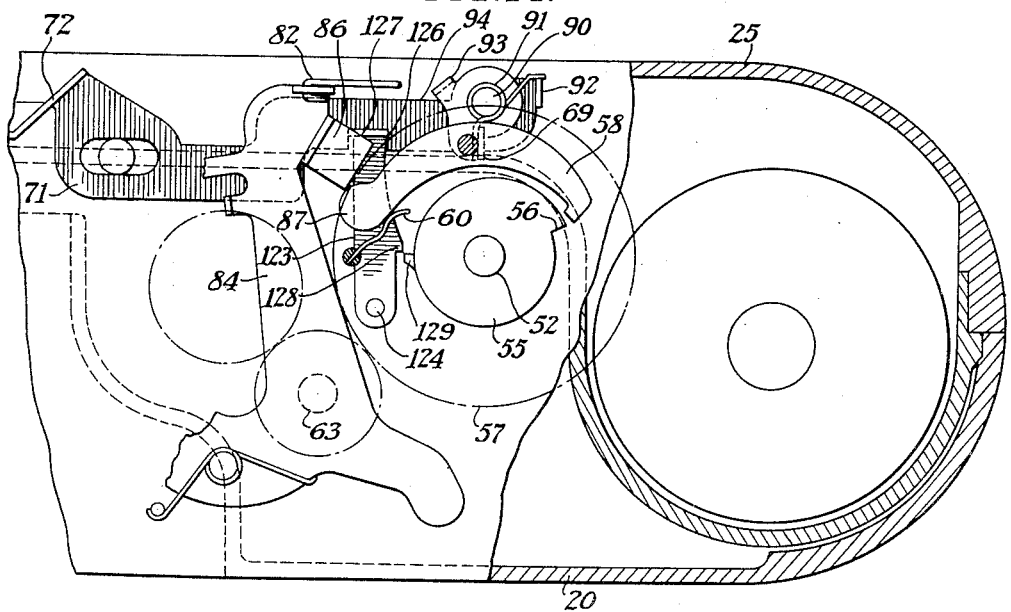
Fig. 14 is a view similar to Fig. 13, but showing the relation of the parts just after the actuation of the shutter trigger.

The shaft 48 has a portion 52 which extends through a wall 53 of the camera body 20 and into a mechanism compartment 54. This compartment houses various control mechanisms, but only so much of these mechanisms will be shown and described as is necessary to fully understand the present invention. The portion 52 of the shaft 48 has fixed thereon a holding ratchet 55 having a single tooth or shoulder 56. A stub-shaft, not shown, is positioned in the compartment 54 in axial alignment with the shaft 48 and has secured thereto a flat circular disk 57. A pawl 58 is pivoted at 59 on the disk 57 and is normally held in engagement with the tooth 56 by means of a spring 60 carried by the disk 57. It is now apparent that when the measuring roll shaft 48 is rotated by the spring motor drive to shift the film strip, the ratchet 55 will be rotated in a clockwise direction, as viewed in Fig. 13. Such rotation will cause the tooth 56 to engage the pawl 58 to similarly rotate the disk 57. Such rotation of the disk will turn the stub-shaft on which the disk is mounted. This shaft also has mounted thereon a gear 61 which is operatively connected to a gear 62 on a stub-shaft 63 which turns a second gear 64 adapted to mesh with the gear 65 on the shutter curtain tensioning shaft 66. It is thus apparent that as the film is fed and wound, the shutter is also tensioned. The details of the connection between the measuring roll shaft 48 and the shutter tensioning shaft 66 are fully set forth in the applicant's Patent No. 2,253,084, issued August 19, 1941, or active Patent No. 2,140,446, issued December 13, 1938, to which reference may be had for a more detailed disclosure.

The pivot pin 59 of the pawl 58 is a stud which depends from the disk 57 and into the path of an upturned ear 69 formed on the end of a slidable bar, generally indicated by the numeral 70, see Figs. 2 and 7. As mentioned above, the winding of the film turns the disk 57 in a clockwise direction, as viewed in Fig. 13. When the film has been moved a distance of one image area, the disk 57 is moved to a position in which the pin 59 engages the ear 69, see Fig. 2 and slides the bar 70 to the left, as viewed in Fig. 2, or to the right as viewed in Figs. 3, 5, 7, and 8. The bar 70 is suitably guided on the wall 53 and is of the shape best shown in Fig. 8, and has a lower horizontal portion 71 to which the ear 69 is secured, as will be later described. The bar 70 is also formed with a vertical intermediate portion 72 and an upper horizontal portion 73, the latter carrying a hook 74 which is adapted to slide over teeth 75 formed on the under side of a counter dial 76 when the bar 70 is slid in the direction above described.

An operating button or trigger 78 is slidably mounted in the upper left-hand corner of the camera body. Downward movement of the trigger serves to actuate a shutter to make an exposure, and to also swing a bellcrank 79 in a counter-clockwise direction about its pivot 80, see Fig. 2, against the action of a spring 81; and, through a link 82 which connects the bellcrank with an upturned lug 83 on a release bar 84, to pull the latter to the left about its pivot 85. At this point, a lug 86 on the lever 84 engages the free end 87 of the pawl 58 and swings the latter in a counter-clockwise direction about its pivot 59, as viewed in Fig. 13, to disengage the pawl from the tooth 56 of the holding ratchet 55. As the disk 57 is now free and disconnected from the measuring roll shaft, the disk is quickly rotated in a counter-clockwise direction under the action of the shutter tensioning spring, not shown. Such rotation of the disk 57 serves to move the pin 59 out of the path of the bar 70, and the latter quickly moves to the left, as viewed in Figs. 3, 7, and 8, under the action of a coil spring 88 one end of which is anchored to the camera body and the other end of which is secured to the portion 72 of the bar 70. The disengagement of the disk 57 also frees the measuring roll shaft 48 so that the spring motor drive may rotate the film winding mechanism. In addition, such leftward movement of the bar 70 will bring the hook 74 into engagement with the teeth 75 of the counter to move the latter a distance sufficient to indicate an exposure. In making some exposures, for example 1/25 of a second, the disk 57 may be rotated in a counter-clockwise direction a distance sufficient to actually bring the pin 59 into engagement with the ear 69 so as to cooperate with the spring 88 moving the bar 70 to counter actuating position.

The above-described mechanism thus provides an arrangement by which (1) the spring motor drive unit is locked when removed from the camera body (2) the winding of the film strip also serves to tension the shutter and to move the counter-actuating member into position to actuate the counter; and (3) the actuation of the trigger to make the exposure disconnects the shutter tensioning mechanism from the film winding mechanism and also actuates the counter to indicate the making of an exposure. These mechanisms are fully shown and described in the applicant's Patents No. 2,135,984 and No. 2,140,-446, issued November 8, 1938, and December 13, 1938, respectively, and applicant's Patent No. 2,253,084. While the above-described mechanisms do not per se constitute a part of the present invention they do cooperate with a power unit locking mechanism embodied in the present invention. Therefore, to fully understand the operation of the present spring motor locking device, the description of the various mechanisms associated therewith are deemed essential. However, only so much of the mechanisms have been described as is necessary to fully understand the present invention.

The above-mentioned ear 69 may be formed integral with the bar 70. With such a construction, however, the quick rotation of the disk 57 after release of the shutter trigger might, in making certain exposures, cause the stud 59 to strike the ear 69 with considerable force and might tend to break or bend some of the parts. In order to eliminate such a condition, the ear 69 is preferably formed up from a member 89, of the shape best shown in Fig. 5, which is pivoted at 90 on the end of the bar 70, as illustrated in Figs. 5 and 7. A coil spring 91 is wrapped around the pivot 90 and has one end anchored to an extension 92 of the bar 70 and the other end secured to the member 89 and tends to rotate the latter in a counter-clockwise direction, as viewed in Fig. 5. Such rotation is limited by the engagement of a downwardly extending lug 93 on the member 89 with an edge 94 of the bar 70, as shown in Fig. 5. Now, when the disk 57 is rotated during the film winding operation, the stud 59 will finally engage the left side of the ear 69, as viewed in Fig. 5, to slide the bar 70 to the right. At this time the bar 70 and the member 89 moves as a unit and are, in effect, a single unit. However, when the disk 57 is disengaged, it will quickly rotate in the opposite direction to bring the stud 59 into engagement with the right side of the ear 69. However, as the latter is formed on the member 89, the latter will move in a clockwise direction about its pivot 90, against the action of the spring 91, to gradually retard the stud 59, the advantages of which are obvious to those in the art. By means of this simple arrangement, the return of the stud 59 is cushioned, and any danger of bending or breaking of the parts is thereby eliminated.

As pointed out above, the actuation of the shutter trigger serves to disconnect the shutter tensioning shaft 66 and the measuring roll shaft 48. Such disconnection frees the latter so that it may be rotated to move the film strip through the camera and to wind up the exposed film onto the take-up spool 51. However, after the film has thus been wound and a new image area moved into exposing position, means must be provided for arresting further rotation of the measuring roll shaft to prevent further film movement. To this end, the present invention provides an arrangement for automatically and positively locking the spring motor or power unit at the end of the film winding operation.

Obviously, this locking mechanism could be applied to the spring motor 42 or to any of the gears which connect the spring motors to the governor shaft 41 or the dish-shaped gear 43. However, due to the mechanical advantage between the motor and governor shaft, the latter carries a relatively light load so that a slight pressure applied to the governor shaft will be sufficient to stop the operation of the spring motor drive and the film winding mechanism. The locking means is, therefore, preferably applied to the governor shaft. The latter has a portion 95 which projects through a registering opening 96 of the plate 24, see Fig. 4, and has mounted on the free end thereof the disk 40 on which the locking lugs 39 are formed. These lugs are adapted to be engaged by the hook 37 to lock the spring motor when the camera back is removed from the camera body, as above described. A locking plate or lever 97 is slidably mounted on the plate 24 adjacent the disk 40 and is connected thereto by means of rivets 98 which extend through slots 99 formed on the lever 97, as clearly illustrated in Fig. 3. The lower end of the locking lever is formed with a U-shaped offset portion 100 which is adapted to engage one of the lugs 39 to also lock the governor shaft and hence the motor drive unit. A spring 101 is wrapped around a stud 102 on the plate 24 and has one end held in place thereon by a pin 103 while the other end engages an upturned lug 104 on the locking lever 97, as clearly illustrated in Fig. 3. This spring thus tends to lift or hold the lever 97 upwardly to bring the portion 100 into locking engagement with one of the lugs 39. Thus the lever 97 is also utilized to lock the motor drive mechanism. However, the lever 97 and hook 37 are not both in the locking engagement at the same time as will be later explained.

It is apparent that as long as the portion 97 is in engagement with one of the lugs 39, the motor drive will be effectively locked and the film winding mechanism will be inoperative to move the film strip. However, if the lever 97 is moved downwardly to disengage the lug 39, the motor will be free so that it will then be effective to rotate the shaft 48 to move and wind the film. At the completion of the winding operation, the portion 97 is again moved into locking engagement with one of the lugs 39 to arrest further movement of the spring motor drive. This movement of the lever 97 into locking engagement with the governor shaft is preferably controlled by the film winding mechanism so as to be operated in timed relation therewith.

To this end, the intermediate portion 72 of the slidable bar 70 has connected thereto an extension 106 the free end of which carries a pin 107 positioned in a slot 108 of a lever 109 pivoted at 110 on a lug 111 on the wall 53, see Figs. 3 and 8. The lever 109 is formed with an arm 112 the free end of which is connected by a ball and socket joint 113 to the upper end of a push rod 114 slidably mounted in a sleeve 115 in the wall 53. A spool-shaped member 116 is vertically slidable in the wall 53 and has an upper flange 117 positioned in a recess 118 in the wall 53 and adapted to be engaged by the lower end 119 of the push rod 114, see Fig. 3. The lower end of the spool-member 116 is formed with a flange 120 adapted to engage a lug 121 formed on the upper end of the locking lever 97, see Fig. 3.

It is now apparent that when the bar 70 is slid to the right, as viewed in Fig. 3, by reason of the engagement of the stud 59 with the ear 69 during the film winding operation, the extension 106 of the bar 70, through the pin and slot connection 107 and 108, will pivot the lever 109 in a clockwise direction to move the lever 109 out of engagement with the spool-shaped member 116. The spring 101 will then become effective to slide the locking lever 97 and the member 116 upwardly to move the portion 100 into locking engagement with one of the lugs 39 to positively lock the spring motor drive and hence the film winding mechanism. However, upon operation of the shutter trigger 78, the bar 70 is freed and moves to the left, as viewed in Fig. 3, under the action of the spring 88. This leftward movement then pivots the lever 109 in a counter-clockwise direction, see Fig. 3, to move the lower flange 120 of the member 116 into engagement with the lug 121 on the locking lever 97 to slide the latter downwardly and out of locking engagement with the lug 39 to free the motor drive unit so the latter may be rendered effective to rotate the film winding mechanism. While the spring 88 may be made of sufficient strength to move the bar 70 and the extension 106, as well as the lever 109, member 116, and locking lever 97, it is preferred to provide an auxiliary spring which will relieve spring 88 of some of its load. This auxiliary spring is in the form of a coil spring 122 wrapped around the pivot 110 and having one end hooked over the arm 112 and the other end pressing against the pin 107 and the extension 106.

By means of the above-described mechanism, the locking lever 97 is moved into locking engagement with the governor shaft to effectively lock the spring motor drive at the completion of the film winding operation. The subsequent actuation of the shutter trigger then serves to move the lever 97 out of locking engagement to release the spring motor drive to wind the exposed film area. While the engagement of the locking lever 97 with the lug 39 of the governor shaft effectively locks the motor drive, it is preferred to provide an additional or safety locking device which will cooperate with the locking lever 97. This safety lock comprises a tumbler lever 123 pivoted at 124 on the plate 53 and having the free end 125 positioned in a notch or recess 126 formed in the bar 70. The portion of the bar 70 forming the recess 126 is bent upwardly to provide a lug 127, the purpose of which will be later explained.

It is now apparent that any sliding movement of the bar 70 will serve to move the tumbler lever 123 about its pivot 124. Now when the bar 70 is moved to the right, Fig. 5, by the stud 59 during the film winding operation, the edge of the notch 126 engages the end 125 of the lever 123 to move the latter to the right to bring the holding lug 128 thereon into engagement with the shoulder 129 on the portion 52 of the measuring roll shaft to lock the latter, and hence the winding mechanism against further actuation. This tumbler lever 123 with its holding lug 128 is almost identical with the structure used in the well-known window shade to lock the spring thereof in tensioned position. This tumbler lever thus affords a safety latch which cooperates with the locking lever 97 to provide a dual lock for the motor drive and the film winding mechanism. As the lever 70 is slid in reverse direction by the springs 88 and 121, the opposite edge of the recess 126 engages the tumbler latch 123 to move the lug 128 thereof out of locking engagement with the shoulder 129 to release the measuring roll shaft 48 as will be apparent from an inspection of Fig. 5.

It will be remembered that when the trigger 78 is depressed to make an exposure, the lug 86 on the release lever 84 will pivot the pawl 58 to disengage the disk 57 so that the latter will rotate to move the stud 59 out of engagement with the sliding bar 70. As the latter is now free, it will tend to move under the action of the springs 88 and 122 to shift the locking lever 97 out of locking engagement with the motor drive so that the latter may easily become effective to shift the film. It is essential, however, both with instantaneous and delayed exposures, to positively insure that no movement of the film strip occurs until after the exposure has been completed.

To this end, the bar 70 is provided with the previously mentioned formed-up member or lug 127 which is positioned in the path of the lug 86 of the release lever 84. Now when the latter is moved to disengage the pawl 58 upon depression of the trigger 78, the lug 86 engages the lug 127 to lock the bar 70 against movement by the springs 88 and 122, thus effectively preventing disengagement of the locking lever 97 and hence movement of the film strip. When, however, the trigger 78 is released, the lug 86 is moved away from the lug 127 so that the bar 70 may move to disengage the locking lever 97 to free the spring motor drive. The above-described mechanism thus insures that the spring motor and the film winding mechanism are locked against further rotation at the completion of the film winding operation, and are retained in the locking position until the completion of exposure. Upon final operation of the shutter trigger, the spring motor is then released to wind the film.

When, however, the back 27 is to be removed from the camera, the locking lever 97 is preferably shifted to and retained in an inoperative position and out of locking engagement with the governor shaft 41. The latter is then locked by reason of the engagement with the hook 37 with one of the lugs 39 of the governor shaft, as above described. When the back is to be removed, the button 29 is first rotated in the direction of the arrow, Fig. 3. Such rotation, similarly rotates a cam 130 carried by the stud 30 to move the cam into engagement with an inclined shoulder 131 of the locking lever 97, see Fig. 3. Now by sliding the button to the right or to the position shown in Fig. 3, the hook 37 is moved into engagement with one of the lugs 39, while the cam 130 slides upwardly along the inclined shoulder 131 to gradually move the portion 100 of the locking lever 97 downwardly and out of engagement with the lug 39. The arrangement is such that the hook 37 engages the lug 39 slightly in advance of the disengagement of the portion 100 therefrom. When, however, the back is again secured to the camera, the button 29 is slid to the left, Fig. 3, to disengage the hook 37 from and to engage the portion 100 with the lug 39. The button is then rotated in a counter-clockwise direction, as viewed in Fig. 3, to lock the back to the camera and to simultaneously move the cam 130 out of engagement with the shoulder 131. The locking lever 97 is then moved upwardly by the spring 101 to bring the lug 121 into engagement with the lower flange 120 and the spool-shaped member 116. As the latter and the push rod 114 move as a unit they may be broadly considered as a unitary reciprocating member.

While the operation of the various mechanisms have been described in detail, such operation may be briefly summarized as follows: When the camera back, or the motor drive, is detached from the camera, the motor drive locking members are in the position shown in Fig. 3. After placing the back on the camera body, the button 29 is slid to the left and rotated in a counterclockwise direction, as viewed in Fig. 3. Such movement disengages the hook 37 from and moves the portion 100 on the locking lever 97 into engagement with the lug 39, assuming of course that the shutter is tensioned. Now upon actuation of the shutter trigger 78, the lug 86 of the release lever 84 engages the pawl 58 to disengage the disk 57 from the measuring roll shaft 48. The disk 57 is then quickly rotated, under the action of the shutter spring, to move the stud 59 out of engagement with the ear 69 so that the bar 70 may slide under the action of the springs 88 and 122 to move the locking lever 97 downwardly to disengage the portion 100 thereof from the lug 39 and simultaneously to disengage the tumbler lever 123 from the measuring roll shaft 48. The spring motor drive is now free and operates to rotate the measuring roll shaft 48 to move the film strip across the camera and to wind the exposed film onto the take-up spool 51. Such rotation of the shaft 48 causes the ratchet 55 to engage the pawl 58 to also rotate the disk 57 as a unit with the shaft 48.

At the completion of the film winding operation, the pivoted stud 59 of the pawl 58 engages the ear 69 on the bar 70 to slide the latter in the opposite direction to move the spool-like member 116 out of engagement with the lug 121 formed on the upper end of the locking lever 97. As the latter is now unrestrained, it will be urged upwardly by its spring 101 to again bring the portion 100 into locking engagement with the lug 39 to lock the motor drive. Simultaneously with the locking of the motor drive, the tumbler lever 123 is moved by the bar 70 to bring the holding lug 128 into locking engagement with the shoulder 129 on the portion 52 of the measuring roll shaft 48 to lock the latter, and hence the film winding mechanism. Thus a dual lock is provided, one locking the motor drive, and the other locking the film winding mechanism. These two locking devices effectively prevent any operation of the winding mechanism until an exposure has been made.

It is thus apparent from the present invention that the present invention provides an arrangement for effectively locking the spring motor drive at the completion of each winding operation and for also releasing the motor drive upon the making of an exposure. Such locking mechanism is controlled by and in timed relation with the film winding mechanism. Furthermore as the locking device engages the governor shaft of the motor drive unit, little power is required to effect such locking. The release of the shutter trigger then serves to disengage the spring motor drive so the latter may become effective to wind the film strip. However, the film motor drive is not released until the exposure has been completed so that no film movement occurs during the exposure, the advantages of which are obvious to those in the art.

While one embodiment of the invention has been disclosed, it is to be understood that the inventive idea may be carried out in a number of ways. This application is therefore not to be limited to the precise details described but is intended to cover all variations and modifications thereof falling within the scope of the appended claims.

I claim:

1. In a camera, the combination with a camera body, film winding means rotatably mounted on said body, a power drive unit connected to said winding means and adapted to operate the latter to move a film strip through said camera, of a lever slidably mounted on said body and arranged to be moved into and out of locking engagement with said power unit, means including a sliding bar mounted on said body adjacent said lever and adapted to engage said lever both to shift and to hold positively the latter out of locking engagement with said power unit to permit the latter to move said strip, means controlled by said winding means for moving said lever shifting means out of engagement with said lever only after a predetermined length of film has been moved by said winding means, and means for then moving said lever into locking engagement with said power unit to arrest the rotation of said winding means.

2. In a camera, the combination with a camera body, film winding means rotatably mounted on said body, a power drive unit connected to said winding means and adapted to operate the latter to move a film strip through said camera, of a lever mounted on said body and arranged to be moved into and out of locking engagement with said power unit, a push rod slidably mounted on said body, means for moving the push rod into engagement with said lever both to shift and to hold the latter out of locking engagement with said power unit to permit the latter to move said strip, means controlled by said winding means for shifting said rod to a retracted position and out of engagement with said lever only at the completion of the film winding operation to free the lever in timed relation to the movement of said winding means, and means for concomitantly shifting said lever into locking engagement with said power unit to arrest the rotation of said winding means.

3. In a camera, the combination with a camera body, film winding means rotatably mounted on said body, a power drive unit connected to said winding means and adapted to operate the latter to move a film strip through said camera, of a lever mounted on said body and arranged to be moved into and out of locking engagement with said power unit, a push rod slidably mounted on said body, means independent of said winding means for moving said push rod into engagement with said lever both to shift and to hold the latter out of locking engagement with said power unit to free the latter so that it may become effective to move said strip, means controlled by and in timed relation with said winding means for moving said push rod out of engagement with said lever to free the latter only after a predetermined length of film has been moved by said winding means, and means independent of the operation of said winding means for simultaneously moving said lever into locking engagement with said power unit to arrest the rotation of said winding means.

4. In a camera, the combination with a camera body, film winding means rotatably mounted on said body, a power drive unit connected to said winding means and adapted to operate the latter to move a film strip through said camera, of a lever mounted on said body and arranged to be moved into and out of locking engagement with said power unit, means movable into engagement with said lever to shift the latter out of locking engagement with said power unit to free the latter so that it may be rendered effective to move said strip, means controlled by said winding means for moving said lever shifting means out of engagement with said lever to free the latter after a predetermined length of film has been moved by said winding means, means actuated by said winding means for holding said lever shifting means out of engagement with said lever, and means independent of said winding means for then moving the freed lever into engagement with said power drive to arrest further operation of said winding means.

5. In a camera, the combination with a camera body, film winding means rotatably mounted on said body, a power drive unit connected to said winding means and adapted to operate the latter to move a film strip through said camera, of a lever mounted on said body and arranged to be moved into and out of locking engagement with said power unit, means movable into engagement with said lever to shift the latter out of locking engagement with said power unit to free the latter so that it may be rendered effective to move said strip, means controlled by said winding means for moving said lever shifting means out of engagement with said lever to free the latter after a predetermined length of film has been moved by said winding means, means actuated by said winding means for holding said lever shifting means out of engagement with said lever, means independent of said winding means for then moving the freed lever into engagement with said power drive to arrest further operation of said winding means, and manual control means for releasing said lever shifting means from its moving and holding means so that it may be moved to shift said lever out of locking engagement with said power unit.

6. In a camera, the combination with a camera body, film winding means rotatably mounted on said body, a power drive unit connected to said winding means and adapted to operate the latter to move a film strip through said camera, of a lever mounted on said body and arranged to be moved into and out of locking engagement with said power unit, means movably mounted on said body adjacent said lever and adapted to shift the latter out of locking engagement with said power unit to permit the latter to move said strip, a slidable bar mounted on said body and connected to said lever shifting means, means for sliding said bar in one direction to move said lever shifting means to shift said lever, a member connectable to said winding means, means on said member arranged to engage and slide said bar in the opposite direction to move said lever shifting means out of engagement with said lever to free the latter after a predetermined length of film has been wound, and means independent of said winding means and said bar for moving the freed lever into locking engagement with said power unit.

7. In a camera, the combination with a camera body, film winding means rotatably mounted on said body, a power drive unit connected to said winding means and adapted to operate the latter to move a film strip through said camera, of a lever mounted on said body and arranged to be moved into and out of locking engagement with said power unit, means movably mounted on said body adjacent said lever and adapted to shift the latter out of locking engagement with said power unit to permit the latter to move said strip, a slidable bar mounted on said body and connected to said lever shifting means, means for sliding said bar in one direction to move said lever shifting means to shift said lever, a member connectable to said winding means, means on said member arranged to engage and slide said bar in the opposite direction to move said lever shifting means out of engagement with said lever to free the latter after a predetermined length of film has been wound, and manual control means for disconnecting said member from said winding means and for moving the means on said member out of engagement with said bar so that said bar sliding means becomes effective to move said lever shifting means to shift said lever out of locking engagement with said power unit so that said winding means may be rotated to wind said film.

8. In a camera, the combination with a camera body, film winding means rotatably mounted on said body, a power drive unit connected to said winding means and adapted to operate the latter to move a film strip through said camera, of a lever mounted on said body and arranged to be moved into and out of locking engagement with said power unit, means movably mounted on said body adjacent said lever and adapted to shift the latter out of locking engagement into said power unit to permit the latter to move said strip, means controlled by said winding means for moving said lever shifting means out of engagement with said lever after a predetermined length of film has been moved by said winding means, and auxiliary power-unit locking means actuated by said winding means.

9. In a camera, the combination with a camera body, film winding means rotatably mounted on said body, a power drive unit connected to said winding means and adapted to operate the latter to move a film strip through said camera, of a lever mounted on said body and arranged to be moved into and out of locking engagement with said power unit, means movably mounted on said body adjacent said lever and adapted to shift the latter out of locking engagement with said power unit to permit the latter to move said strip, a slidable bar mounted on said body and connected to said lever shifting means, means for sliding said bar in one direction to move said lever shifting means to shift said lever, a member connectable to said winding means, means on said member arranged to engage and slide said bar in the opposite direction to move said lever shifting means out of engagement with said lever to free the latter after a predetermined length of film has been wound, an arm pivotally mounted on said body and arranged to be engaged and moved by said bar, means on said arm adapted to engage and lock said winding means when said bar is slid in said opposite direction, and spring means operatively connected to said lever for moving the latter, when freed, into locking engagement with said power means, said arm and lever cooperating to lock said power unit and said winding means when a predetermined length of film has been moved by said winding means.

10. In a camera, the combination with a camera body, film winding means rotatably mounted on said body, a power drive unit connected to said winding means and adapted to operate the latter to move a film strip through said camera, a shutter release trigger mounted on said body, of a lever slidably mounted on said body and adapted to be moved into and out of locking engagement with said power unit, a push rod mounted for reciprocating movement on said body and arranged to be moved into engagement with said lever to shift the latter out of engagement with said power unit to render the latter effective to operate said winding means, a bar slidably mounted on said body and operatively connected to said push rod, means controlled by said trigger for shifting said bar in one direction to move said rod into engagement with said lever only upon the completion of an exposure to disengage the latter from said power unit to free the latter, means controlled by said winding means for shifting said bar in the opposite direction to move said rod out of engagement with said lever, a spring for then sliding said lever into locking engagement with said power unit, an arm pivotally mounted on said body and movable by said bar, and auxiliary locking means comprising cooperating portions on said arm and said winding means arranged to be moved into interengaging relation to lock said winding means when said bar is slid in said opposite direction.

11. In a camera, the combination with a camera body, film winding means rotatably mounted on said body, a power drive unit connected to said winding means and adapted to operate the latter to move a film strip through said camera, a shutter release trigger mounted on said body, of a lever mounted on said body and arranged to be moved into and out of locking engagement with said power unit, a member mounted on said body and movable in one direction to engage and move said lever to disconnect the latter from said power unit to render the latter effective to rotate said winding means, means controlled by said trigger for moving said member in said one direction, means controlled by said trigger for arresting such movement of said member until the completion of the film exposing operation, means controlled by said winding means for moving said member in the opposite direction to disengage said member from said lever to free the latter after a predetermined length of film has been wound by said winding means, means for moving the freed lever into locking engagement with said power unit, and auxiliary locking means controlled by said winding means and movable into locking engagement therewith substantially simultaneously with the locking of said power unit.

12. In a camera, the combination with a camera body, a film measuring-roll shaft rotatably mounted in said body and adapted to engage and move a film strip thereacross, a power drive unit carried by said body and connected to said shaft to operate the latter, a shutter release trigger positioned on said body adjacent said shaft, a ratchet on said shaft, a second shaft in axial alignment with said first shaft, a disk loosely mounted on said second shaft, a pawl pivotally carried by said disk and movable into engagement with said ratchet to releasably connect said disk to said first shaft, of a lever slidably mounted on said body and having a portion thereof adapted to be moved into and out of locking engagement with said power unit, a push rod reciprocally mounted on said body and movable into and out of engagement with said lever, a bar slidably mounted on said body and operatively connected to said push rod, a pin on said disk arranged upon rotation of said shaft to engage said bar to slide the latter in one direction to move said rod out of engagement with said lever when a predetermined length of film has been moved by said first shaft, a spring connected to said lever to shift the latter to move said portion into locking engagement with said power unit, an arm pivotally mounted on said body adjacent said second shaft and arranged to be engaged and moved by said bar, a shoulder on said first shaft adjacent said disk, a lug on said arm movable into engagement with said shoulder when said bar is moved in said one direction to lock said first shaft substantially simultaneously with the locking of said power unit, a release member operatively connected to said trigger, means on said release member arranged to engage said pawl upon actuation of said trigger to disengage the pawl from said ratchet and to disconnect the disk from said first shaft to allow said pin to be moved out of engagement with said bar, an upturned ear on said bar arranged to engage said release member to prevent movement of said bar in the opposite direction until the trigger is released, the releasing of said trigger then serving to move said release member out of the path of the ear on said bar to free the latter, and a spring connected to said bar to move the latter in the opposite direction to move said rod into engagement with said lever to disconnect the latter from said power unit, the movement of said bar in said opposite direction also serving to move said arm to disengage the lug thereon from the shoulder on said first shaft to free the latter.

13. In a camera, the combination with a camera body, a film measuring roll shaft rotatably mounted in said body and adapted to engage and move a film strip thereacross, a power drive unit connected to said shaft to operate the latter, a second shaft in axial alignment with said first shaft, a rotatable member mounted on said second shaft, clutch means for releasably connecting said member to said first shaft, of a lever slidably mounted on said body and movable into and out of locking engagement with said power unit, a member reciprocally mounted on said body and movable to one position to engage said lever to shift the latter out of locking engagement with said power unit, means for operatively connecting said rotatable member and said reciprocal member so that the latter will be moved out of said one position and to another position to disengage said lever when a predetermined length of film has been moved by said winding means, means for then shifting said lever into locking engagement with said power unit for arresting further rotation of said winding means, an exposure control member positioned on said body, means actuated by said control member for disconnecting said clutch to disengage said reciprocally mounted member from said rotatable member, and means for then moving said reciprocal member to said one position to shift said lever out of locking engagement with said power unit.

14. In a camera, the combination with a camera body, a film measuring roll shaft rotatably mounted in said body and adapted to engage and move a film strip thereacross, a power drive unit connected to said shaft to operate the latter, a second shaft in axial alignment with said first shaft, a rotatable member mounted on said second shaft, clutch means for releasably connecting said member to said first shaft, of a lever slidably mounted on said body and movable into and out of locking engagement with said power unit, a member reciprocally mounted on said body and movable to one position to engage said lever to shift the latter out of locking engagement with said power unit, means for operatively connecting said rotatable member and said reciprocal member so that the latter will be moved out of said one position and to another position to disengage said lever when a predetermined length of film has been moved by said winding means, means for then shifting said lever into locking engagement with said power unit for arresting further rotation of said winding means, an exposure control member positioned on said body, means actuated by said control member for disconnecting said clutch to disengage said reciprocally mounted member from said rotatable member, means for then moving said reciprocal member to said one position to shift said lever out of locking engagement with said power unit, and auxiliary locking means controlled by said winding means and arranged to engage said first shaft to lock the latter at the end of the winding operation.

JOSEPH MIHALYI.